United States Patent
Wang et al.

(10) Patent No.: US 12,130,449 B2
(45) Date of Patent: Oct. 29, 2024

(54) ANTI-BLUE LIGHT ANTI-INFRARED RESIN LENS WITH REFRACTIVITY OF 1.50 AND PREPARATION METHOD THEREOF

(71) Applicants: Jiangsu Conant Optical Co., Ltd., Nantong (CN); Shanghai Conant Optical Co., Ltd., Shanghai (CN)

(72) Inventors: Chuanbao Wang, Nantong (CN); Qingbo Yan, Nantong (CN); Jian Huang, Nantong (CN); Liangliang Shi, Nantong (CN)

(73) Assignees: Jiangsu Conant Optical Co., Ltd., Nantong (CN); Shanghai Conant Optical Co., Ltd., Shanghai (CN)

( * ) Notice: Subject to any disclaimer, the term of this patent is extended or adjusted under 35 U.S.C. 154(b) by 758 days.

(21) Appl. No.: 17/316,479

(22) Filed: May 10, 2021

(65) Prior Publication Data
US 2021/0263197 A1    Aug. 26, 2021

Related U.S. Application Data

(63) Continuation-in-part of application No. PCT/CN2020/088781, filed on May 6, 2020.

(30) Foreign Application Priority Data

Dec. 6, 2019   (CN) .......................... 201911244159.7

(51) Int. Cl.
| | | |
|---|---|---|
| *G02B 1/00* | (2006.01) |
| *B29C 39/00* | (2006.01) |
| *B29C 39/38* | (2006.01) |
| *B29D 11/00* | (2006.01) |
| *G02B 1/04* | (2006.01) |
| *G02B 3/00* | (2006.01) |
| *B29K 69/00* | (2006.01) |
| *B29K 105/00* | (2006.01) |

(52) U.S. Cl.
CPC .......... *G02B 3/0031* (2013.01); *B29C 39/006* (2013.01); *B29C 39/38* (2013.01); *B29D 11/00442* (2013.01); *G02B 1/007* (2013.01); *G02B 1/041* (2013.01); *B29C 2791/002* (2013.01); *B29K 2069/00* (2013.01); *B29K 2105/0002* (2013.01); *B29K 2909/08* (2013.01); *B29K 2995/0031* (2013.01)

(58) Field of Classification Search
CPC ...... G02B 1/007; G02B 1/041; G02B 3/0031; B29C 39/006; B29C 39/38; B29C 2791/002; B29K 2069/00; B29D 11/00442
See application file for complete search history.

(56) References Cited

U.S. PATENT DOCUMENTS

2019/0292342 A1\*   9/2019   Kikuchi ................... C08J 7/046

FOREIGN PATENT DOCUMENTS

| CN | 108456284 A | * | 8/2018 | .......... C08F 283/008 |
| CN | 108594470 A | * | 9/2018 | ............. G02B 5/208 |

\* cited by examiner

*Primary Examiner* — Bijan Ahvazi
(74) *Attorney, Agent, or Firm* — CBM Patent Consulting, LLC

(57) ABSTRACT

The present invention discloses an anti-blue light anti-infrared resin lens having a refractivity of 1.50, and a preparation method thereof. The lens comprises 100 parts by weight of CR39 resin monomer, 0.5-5 parts by weight of an initiator, and 1.0216-30.6 parts by weight of an additive, where the additive includes an anti-infrared absorber, a blue light absorber, and a hardness modifier at a weight ratio of 0.0005-0.5:0.001-10:1-10, the initiator is benzoyl peroxide, dicumyl peroxide, or 1,1-di-tert-butylperoxy-3,3,5-trimethylcyclohexane. The resin lens prepared in the present invention has both blue light absorption effect and near-infrared absorption effect and is capable of being dyed as needed to have the effect of sunglasses, while the quality of the lens is guaranteed. The resin lens is a new type of multifunctional resin lens.

6 Claims, No Drawings

ANTI-BLUE LIGHT ANTI-INFRARED RESIN LENS WITH REFRACTIVITY OF 1.50 AND PREPARATION METHOD THEREOF

This application is the continuation-in-part of International Application No. PCT/CN2020/088781 filed on 6 May 2020 which designated the U.S. and claims priority to Chinese Application No. CN201911244159.7 filed on 6 Dec. 2019, the entire contents of each of which are hereby incorporated by reference.

BACKGROUND

The present invention relates to the field of resin lenses, and more specifically to an anti-blue light anti-infrared resin lens with a refractivity of 1.50 and a preparation method thereof.

RELATED ART

More and more electronic products are widely used in daily life, for example, in reading, communication and entertainment. While these products bring simplicity, speed and convenience to humans, invisible harms occur to humans. These digital devices continuously emit short-wave high-energy light, which directly causes great stress on the eyes. Studies have shown that blue light with a wavelength in the range of 380-500 nm, especially blue light with a wavelength in the range of 415-455 nm, seriously affects the physical and mental health of humans. Frequent or prolonged use of these digital devices can cause blurred vision and dazzling, causing visual fatigue and induce tears and other signs, as well as head, neck, and back pain sometime. This is confirmed by Mike-Daley, CEO of the American Optometric Association, in "Report of Digital Eye Fatigue". In addition, it is known that solar radiation includes 10% of ultraviolet light, about 40% of visible light, and remaining 50% of infrared light. For a long time, great attention is paid to the protection against ultraviolet light, but the protections against visible light and infrared light (especially near infrared shortwave) are neglected. Near-infrared light has a strong penetrating ability, and can hardly be absorbed by the existing lens materials. As a result, the infrared light is largely irradiated or reflected into the human eyes. Near-infrared light can reach the fundus and is mainly absorbed by the retina; and the mid-to-far infrared light and far-infrared light are mainly absorbed by the cornea and cannot reach the fundus. Therefore, multifunctional resin lenses able to prevent damages from both blue light and near-infrared light will become a hot spot in the market.

CR39 resin lens, having a refractivity of 1.50 and an Abbe number of 58, is the lens with the highest Abbe number among all resin lenses. It is greatly preferred by consumers in other countries and has excellent dying properties, so CR39 resin lens can be produced into different colors of sunglasses. The demand rises constantly every year. If the anti-blue light and anti-near infrared functions are added, CR39 resin lens will definitely be accepted in the market. In a previous Patent No. CN107678179A entitled "Anti-infrared resin lens and preparation method thereof" filed by the present applicant, when a resin lens with a refractivity of 1.50 is prepared, since the initiator used is diisopropyl peroxydicarbonate having a too strong oxidizability, a small amount of low-valence transition metals in the anti-infrared absorber is oxidized, resulting in a certain degree of fogging in the final lens. Moreover, this initiator will also oxidize the anti-blue light absorber, causing the blue light absorption performance to decrease to fail to meet the requirements of anti-blue light performance. Furthermore, the lens becomes yellowed, and the visible light transmittance decreases. Therefore, it is necessary to find another initiator that has low oxidizability, has no impact on and can initiate the polymerization of CR39 monomer. At present, it is generally recognized all over the world that only diisopropyl peroxydicarbonate can catalyze the polymerization of CR39 monomer. The new initiator will inevitably require the partial modification of CR39 monomer, otherwise the initiator cannot initiate the polymerization of CR39 monomer or causes insufficient lens hardness, and also affects the dying performance of the lens.

SUMMARY

To overcome the above shortcomings, an object of the present invention is to provide an anti-blue light anti-infrared resin lenses with a refractivity of 1.50 and a preparation method thereof, in which the CR39 monomer is blended and modified, to solve the problem of fogging of the lens caused by oxidization of low-valence transition metals in the near infrared absorber by the initiator having a too strong oxidizability, and solve the problem of oxidization of the blue light absorber by the initiator. The lens also has the anti-blue light and anti-infrared functions, and also has good dying performance.

To achieve the above object, the present invention provides an anti-blue light anti-infrared resin lens having a refractivity of 1.50. The lens comprises 100 parts by weight of CR39 resin monomer, 0.5-5 parts by weight of an initiator, and 1.0216-30.6 parts by weight of an additive, where the additive includes an anti-infrared absorber, a blue light absorber, and a hardness modifier at a weight ratio of 0.0005-0.5:0.001-10:1-10, and the initiator is benzoyl peroxide, dicumyl peroxide, or 1,1-di-tert-butylperoxy-3,3,5-trimethylcyclohexane.

The anti-blue light anti-infrared resin lens with a refractivity of 1.50 according to the present invention comprises preferably 100 parts by weight of CR39 resin monomer, 1-3 parts by weight of an initiator, and 2.216-19.33 parts by weight of an additive, where the additive includes an anti-infrared absorber, a blue light absorber, and a hardness modifier at a weight ratio of 0.001-0.3:0.01-5:2-8.

Where the lens needs to be dyed, the additive further includes a dyeing modifier, and the weight ratio of the dyeing modifier to the CR39 resin monomer is 0.0001-0.1:100, and preferably 0.005-0.03:100. The dyeing modifier may be a siloxane-based leveling and dispersing agent, preferably a polyether-modified polyorganosiloxane-based leveling and dispersing agent.

The CR39 resin monomer may be a mixture of diethylene glycol allyl carbonate and a polymer thereof, where the content of monomeric diethylene glycol allyl carbonate is 80-90%, and the rest are a dimer and a trimer.

The anti-infrared absorber can be prepared by uniformly dispersing a rare earth element oxide with a diameter of 10-50 nm in ethylene-butyl acrylate, where the concentration of the rare earth element oxide is 0.5%-5%.

The blue light absorber may be benzophenones, such as one or more of 2-hydroxy-4-methoxybenzophenone, 2-hydroxy-4-n-octyloxybenzophenone, 2-hydroxy-4-dodecyloxybenzophenone, 2-hydroxy-4-benzyloxybenzophenone and 2,2'-dihydroxy-4,4'-dimethoxybenzophenone.

The hardness modifier may be one or two of methyl methacrylate or vinyl acetate.

The additive of the present invention may further include an anti-shrinkage modifier and a self-release modifier, where the weight ratio of the anti-shrinkage modifier and the self-release modifier to the resin monomer is 0.01-5:0.01-5:100, and preferably 0.1-3:0.1-3:100. The anti-shrinkage modifier may be a 2-functional or 6-functional polyurethane acrylate, and the self-release modifier may be a pentaerythritol triacrylate prepolymer.

The anti-blue light anti-infrared resin lens with a refractivity of 1.50 according to the present invention is prepared by a method comprising: pre-dissolving a blue light absorber in a resin monomer at 40-55° C., adding and dissolving an anti-infrared absorber and a hardness modifier after cooling down to normal temperature, then adding an initiator, mixing evenly, pouring into a mold, and then forming by heat curing.

The method for preparing an anti-blue light anti-infrared resin lens with a refractivity of 1.50 includes the following steps:

(1) mixing of materials, comprising: pre-dissolving the blue light absorber in the resin monomer heated to 40° C., optionally adding an anti-shrinkage modifier and a self-release modifier if needed, cooling to a normal temperature of about 25° C. over half an hour, then sequentially adding the anti-infrared absorber and the hardness modifier, optionally adding a dyeing modifier if needed, and finally adding an initiator and mixing for 1-2 hrs under vacuum;

(2) pouring of materials, comprising: filtering the uniformly mixed materials in the step (1) through a 5 μm filter and then pouring into a glass mold by a decanter, and sealing with a tape;

(3) primary curing: positioning the mold with poured materials in the step (2) in a curing furnace for primary curing and forming, where the curing time vs temperature curve includes: an initial temperature of 25-30° C., heating up to 60-65° C. over 1 hr, then heating up to 80-85° C. over 1 hr and holding at 80-85° C. for 20 hrs, heating up to 90-95° C. over 16 hrs, heating up to 100-105° C. over 3 hrs, and then cooling to 75-80° C. over 0.5 hr, in which the curing curve is determined by the initiator, and the heating and cooling processes are both at a constant rate;

(4) releasing from the mold, edging, and washing, comprising: releasing the resulting material from the mold after curing and forming, edging by an edge finishing machine, and cleaning the surface; and (5) secondary curing, comprising: positioning the cleaned lens in the curing oven again for secondary curing at a curing temperature of 105-110° C., for a time of 2-2.5 hrs.

The anti-blue light anti-infrared resin lens with a refractivity of 1.50 in need of dying according to the present invention is prepared by a method comprising: pre-dissolving a blue light absorber in a resin monomer at 40-55° C., adding and dissolving an anti-infrared absorber, a hardness modifier and a dyeing modifier after cooling down to normal temperature, then adding an initiator, mixing evenly, pouring into a mold, forming by heat curing, and then dying.

The method for preparing an anti-blue light anti-infrared resin lens with a refractivity of 1.50 in need of dying includes the following steps:

(1) mixing of materials, comprising: pre-dissolving the blue light absorber in the resin monomer heated to 40° C., optionally adding an anti-shrinkage modifier and a self-release modifier if needed, cooling to a normal temperature of about 25° C. over half an over, then sequentially adding the anti-infrared absorber, the hardness modifier and the dyeing modifier, and finally adding an initiator and mixing for 1-2 hrs under vacuum;

(2) pouring of materials, comprising: filtering the uniformly mixed materials in the step (1) through a 5 μm filter and then pouring into a glass mold by a decanter, and sealing with a tape;

(3) primary curing, comprising: positioning the mold with poured materials in the step (2) in a curing furnace for primary curing and forming, where the curing time vs temperature curve includes: an initial temperature of 25-30° C., heating up to 60-65° C. over 1 hr, then heating up to 80-85° C. over 1 hr and holding at 80-85° C. for 20 hrs, heating up to 90-95° C. over 16 hrs, heating up to 100-105° C. over 3 hrs, and then cooling to 75-80° C. over 0.5 hr, in which the curing curve is determined by the initiator, and the heating and cooling processes are both at a constant rate;

(4) releasing from the mold, edging, and washing, comprising: releasing the resulting material from the mold after curing and forming, edging by an edge finishing machine, and cleaning the surface;

(5) secondary curing, comprising: positioning the cleaned lens in the curing oven again for secondary curing at a curing temperature of 105-110° C., for a time of 2-2.5 hrs; and (6) if dyeing is needed, standing the lens after the secondary curing and forming in a dyeing tank and dying at 85-95° C. for half an hour.

After the above-mentioned preparation steps are completed, a hardening layer and an antireflection film layer may be coated on the surface of the lens. The hardening layer is one coated on the surface of the lens by dip coating, and the antireflection film layer is formed by coating silica, zirconia, indium tin oxide and a waterproof layer on the surface of the lens by vacuum coating.

Compared with the prior art, the present invention has the following beneficial effects:

(1) The resin lens prepared in the present invention has both blue light absorption effect and near-infrared absorption effect and can also be dyed as needed to have the effect of sunglasses, while the quality of the lens is guaranteed. It is a new type of multifunctional resin lens.

(2) In the present invention, a particular initiator is used to synthesize resin lenses with a refractivity of 1.50, which can not only ensure the refractivity and Abbe number of CR39 resin lenses, but also solve the problem of fogging of anti-infrared resin lenses.

(3) The components and proportions thereof used in the present invention allow the prepared resin lenses to have an absorption rate of 50-90% in a near-infrared range of 760-1400 nm, an anti-blue light performance indicated by a band pass rate at 410 nm of less than 1%, a blue light absorption rate in the range of 380-500 nm of 10-30%, and a visible light transmittance reaching 15-16% after the lens is dyed.

(4) In the present invention, the temperature is raised firstly to dissolve additives with a high viscosity, and then lowered to normal temperature to dissolve other additives, and finally the initiator is added to avoid problems such as profiles of the lens and ensure the quality of the lens.

DETAILED DESCRIPTION

Preferred embodiments of the present invention will be described in further detail below in conjunction with specific examples.

Example 1

CR39 resin monomer is a mixture of diethylene glycol allyl carbonate and a polymer thereof, where the content of monomeric diethylene glycol allyl carbonate is 80-90%, and the rest are a dimer and a trimer (ACOMN company, Product Number: 7AX).

The initiator is benzoyl peroxide (Shanghai Haiqu Chemical Co., Ltd.).

The anti-infrared absorber is prepared by uniformly dispersing a rare earth element oxide with a diameter of 10-50 nm (including $Sm_2O_3:Eu_2O_3=3:1$) in ethylene-butyl acrylate, where the concentration of the rare earth element oxide is 2%.

The blue light absorber is 2-hydroxy-4-methoxybenzophenone (Jiangsu Wuxi Henghui Chemical Co., Ltd., UV-9).

The hardness modifier is methyl methacrylate (Degussa).

The anti-shrinkage modifier is a difunctional polyurethane acrylate (Eternal Material Co., Ltd, DR-U079);

The self-release modifier is a pentaerythritol triacrylate prepolymer (Eternal Material Co., Ltd, EM-235).

An anti-blue light anti-infrared resin lens with a refractivity of 1.50 comprises 100 kg of CR39 resin monomer, 1.2 kg of an initiator, 50 g of an anti-infrared absorber, 500 g of a blue light absorber, 1.5 kg of a hardness modifier, 90 g of an anti-shrinkage modifier, and 90 g of a self-release modifier.

The lens preparation steps were as follows.
(1) Mixing of materials: The blue light absorber, the anti-shrinkage modifier and the self-release modifier were pre-dissolved in the resin monomer heated to 40° C., and cooled to a normal temperature of about 25° C. over half an over. Then the anti-infrared absorber and the hardness modifier were sequentially added, and finally the initiator was added and mixed for 1-2 hrs under vacuum.
(2) Pouring of materials: The uniformly mixed materials in the step (1) was filtered through a 5 μm filter, then poured into a glass mold by a decanter, and sealed with a tape.
(3) Primary curing: The mold with poured materials in the step (2) was positioned in a curing furnace for primary curing and forming, where the curing time vs temperature curve comprises: an initial temperature of 25-30° C., heating up to 60-65° C. over 1 hr, then heating up to 80-85° C. over 1 hr and holding at 80-85° C. for 20 hrs, heating up to 90-95° C. over 16 hrs, heating up to 100-105° C. over 3 hrs, and then cooling to 75-80° C. over 0.5 hr; and the heating and cooling processes are both at a constant rate.
(4) Releasing from the mold, edging, and washing: The resulting material was released from the mold after curing and forming, and edged by an edge finishing machine, and the surface was cleaned.
(5) Secondary curing: The cleaned lens was positioned in the curing furnace again for secondary curing at a curing temperature of 105-110° C., for a time of 2-2.5 hrs.
(6) A hardening layer was coated on the surface of the lens by dip coating, and an antireflection film layer was formed by coating silica, zirconia, indium tin oxide and a waterproof layer on the surface of the lens by vacuum coating.

Example 2

CR39 resin monomer is a mixture of diethylene glycol allyl carbonate and a polymer thereof, where the content of monomeric diethylene glycol allyl carbonate is 80-90%, and the rest are a dimer and a trimer (ACOMN company, Product Number: 7AX).

The initiator is dicumyl peroxide (Jinan Guochen Taifu Chemical Co., Ltd).

The anti-infrared absorber is prepared by uniformly dispersing a rare earth element oxide with a diameter of 10-50 nm (including $Sm_2O_3:Eu_2O_3=3:1$) in ethylene-butyl acrylate, where the concentration of the rare earth element oxide is 2%.

The blue light absorber is 2-hydroxy-4-n-octyloxybenzophenone (Nanjing Jingtianwei Chemical Co., Ltd., UV531).

The hardness modifier is vinyl acetate (Shanghai Jinjinle Industry Co., Ltd).

The dyeing modifier is a polyether modified polyorganosiloxane leveling and dispersing agent (Guangdong Rebon Chemical Co., Ltd., RB-1181).

The anti-shrinkage modifier is a hexafunctional polyurethane acrylate (Eternal Material Co., Ltd, 6103).

The self-release modifier is a pentaerythritol triacrylate prepolymer (Eternal Material Co., Ltd, EM-235).

An anti-blue light anti-infrared resin lens with a refractivity of 1.50 comprises 100 kg of CR39 resin monomer, 3 kg of an initiator, 300 g of an anti-infrared absorber, 5 kg of a blue light absorber, 8 kg of a hardness modifier, 30 g of a dyeing modifier, 3 kg of an anti-shrinkage modifier, and 3 kg of a self-release modifier.

The lens preparation steps were as follows.
(1) Mixing of materials: The blue light absorber, the anti-shrinkage modifier and the self-release modifier were pre-dissolved in the resin monomer heated to 40° C., and cooled to a normal temperature of about 25° C. over half an over. Then the anti-infrared absorber, the hardness modifier, and the dyeing modifier were sequentially added, and finally the initiator was added and mixed for 1-2 hrs under vacuum.
(2) Pouring of materials: The uniformly mixed materials in the step (1) was filtered through a 5 μm filter, then poured into a glass mold by a decanter, and sealed with a tape.
(3) Primary curing: The mold with poured materials in the step (2) was positioned in a curing furnace for primary curing and forming, where the curing time vs temperature curve comprises: an initial temperature of 25-30° C., heating up to 60-65° C. over 1 hr, then heating up to 80-85° C. over 1 hr and holding at 80-85° C. for 20 hrs, heating up to 90-95° C. over 16 hrs, heating up to 100-105° C. over 3 hrs, and then cooling to 75-80° C. over 0.5 hr; and the heating and cooling processes are both at a constant rate.
(4) Releasing from the mold, edging, and washing: The resulting material was released from the mold after curing and forming, and edged by an edge finishing machine, and the surface was cleaned.
(5) Secondary curing: The cleaned lens was positioned in the curing furnace again for secondary curing at a curing temperature of 105-110° C., for a time of 2-2.5 hrs.

(6) The lens after the secondary curing and forming was allowed to stand in a dyeing tank and dyed at 85-95° C. for half an hour.

(7) A hardening layer was coated on the surface of the lens by dip coating, and an antireflection film layer was formed by coating silica, zirconia, indium tin oxide and a waterproof layer on the surface of the lens by vacuum coating.

Example 3

CR39 resin monomer is a mixture of diethylene glycol allyl carbonate and a polymer thereof, where the content of monomeric diethylene glycol allyl carbonate is 80-90%, and the rest are a dimer and a trimer (ACOMN company, Product Number: 7AX).

The initiator is 1,1-di-tert-butylperoxy-3,3,5-trimethylcyclohexane (Tianjin AkzoNobel Peroxide Co., Ltd).

The anti-infrared absorber is prepared by uniformly dispersing a rare earth element oxide with a diameter of 10-50 nm (including $Sm_2O_3:Eu_2O_3=3:1$) in ethylene-butyl acrylate, where the concentration of the rare earth element oxide is 2%.

The blue light absorber is 2-hydroxy-4-dodecyloxybenzophenone (Shanghai King Brother Chemical Co., Ltd., UV-1200).

The hardness modifier is methyl methacrylate (Degussa).

The dyeing modifier is a polyether modified polyorganosiloxane leveling and dispersing agent (Guangdong Rebon Chemical Co., Ltd., RB-1181).

The anti-shrinkage modifier is a difunctional polyurethane acrylate (Eternal Material Co., Ltd., DR-U079).

The self-release modifier is a pentaerythritol triacrylate prepolymer (Eternal Material Co., Ltd EM-235).

An anti-blue light anti-infrared resin lens with a refractivity of 1.50 comprises 100 kg of CR39 resin monomer, 1.5 kg of an initiator, 50 g of an anti-infrared absorber, 500 g of a blue light absorber, 3 kg of a hardness modifier, 5 g of a dyeing modifier, 500 g of an anti-shrinkage modifier, and 500 g of a self-release modifier.

The lens preparation steps were as follows.

(1) Mixing of materials: The blue light absorber, the anti-shrinkage modifier and the self-release modifier were pre-dissolved in the resin monomer heated to 40° C., and cooled to a normal temperature of about 25° C. over half an over. Then the anti-infrared absorber, the hardness modifier, and the dyeing modifier were sequentially added, and finally the initiator was added and mixed for 1-2 hrs under vacuum.

(2) Pouring of materials: The uniformly mixed materials in the step (1) was filtered through a 5 μm filter, then poured into a glass mold by a decanter, and sealed with a tape.

(3) Primary curing: The mold with poured materials in the step (2) was positioned in a curing furnace for primary curing and forming, where the curing time vs temperature curve comprises: an initial temperature of 25-30° C., heating up to 60-65° C. over 1 hr, then heating up to 80-85° C. over 1 hr and holding at 80-85° C. for 20 hrs, heating up to 90-95° C. over 16 hrs, heating up to 100-105° C. over 3 hrs, and then cooling to 75-80° C. over 0.5 hr; and the heating and cooling processes are both at a constant rate.

(4) Releasing from the mold, edging, and washing: The resulting material was released from the mold after curing and forming, and edged by an edge finishing machine, and the surface was cleaned.

(5) Secondary curing: The cleaned lens was positioned in the curing furnace again for secondary curing at a curing temperature of 105-110° C., for a time of 2-2.5 hrs.

(6) The lens after the secondary curing and forming was allowed to stand in a dyeing tank and dyed at 85-95° C. for half an hour.

(7) A dyeable hardening layer was coated on the surface of the lens by dip coating, and an antireflection film layer was formed by coating silica, zirconia, indium tin oxide and a waterproof layer on the surface of the lens by vacuum coating.

Comparative Example 1

A resin lens was prepared, where the initiator used was tert-butyl peroxy-2-ethylhexanoate, and the other materials and preparation method were the same as those in Example 3.

Comparative Example 2

A resin lens was prepared, where the initiator used was diisopropyl peroxydicarbonate, and the other materials and preparation method were the same as those in Example 3.

Comparative Example 3

A resin lens was prepared, where the anti-infrared absorber used was the infrared absorber 1122 available from FEW company, Germany, and the other materials and preparation method were the same as those in Example 3.

Comparative Example 4

A resin lens was prepared, where no anti-infrared absorber was added, and the other materials and preparation method were the same as those in Example 3.

Comparative Example 5

A resin lens was prepared, where no dyeing modifier was added, and the other materials and preparation method were the same as those in Example 3.

Comparative Example 6

A resin lens comprises 100 kg of CR39 resin monomer, 10 kg of an initiator, 0.3 g of an anti-infrared absorber, 5 g of a blue light absorber, 1 kg of a hardness modifier, 1 g of a dyeing modifier, 5 g of an anti-shrinkage modifier, and 5 g of a self-release modifier. The species and product numbers of raw materials in the comparative examples are the same as those in Example 3, and the preparation method is also the same as that in Example 3.

The optical performance test results of the lenses prepared in the examples and comparative examples are shown in Table 1.

TABLE 1

Comparison of optical performances of lenses prepared in examples and comparative examples

| Sample | Blue light cut-off band | Absorption rate in 380-500 nm | Infrared absorption rate | Dyeing performance | Barcol hardness | Anti-fogging performance | Lens pass rate | Background color of lens |
|---|---|---|---|---|---|---|---|---|
| Example 1 | 400 nm | 22% | 51.8% | — | 31 | Good | 91.5% | Pale yellow |
| Example 2 | 420 nm | 28.6% | 88.6% | Even dying without blotchy appearance | 38 | Good | 94.6% | Pale yellow |
| Example 3 | 400 nm | 20.6% | 50.6% | Even dying without blotchy appearance | 35 | Good | 90.2% | Pale yellow |
| Comparative Example 1 | — | — | — | — | — | — | Non-formable | — |
| Comparative Example 2 | 395 nm | 18.9% | 48.3% | Even dying without blotchy appearance | 38 | Serious fogging | 92.3% | Dark yellow |
| Comparative Example 3 | 400 nm | 20% | 18% | Even dying without blotchy appearance | 32 | Good | 88% | Pale yellow |
| Comparative Example 4 | 420 nm | 28.6% | 2% | Even dying without blotchy appearance | 38 | Good | 94.2% | Pale yellow |
| Comparative Example 5 | 400 nm | 19.8% | 48% | Uneven dying | 33 | Good | 90.2% | Pale yellow |
| Comparative Example 6 | — | — | — | — | — | — | Implosive, and non-formable | — |

Note:
The anti-blue light performance passes the TM-3 test; the infrared absorption rate is tested by an optical transmittance tester; and the hardness is tested by the Barcol hardness tester. The qualified lens in the table only means that the lens has no spots, scratches, profiles, junks, burrs, and cracked edges.

According to the data in Table 1, it can be seen from Comparative Examples 1, 2 and 6 that the use of different initiators or different ratios of initiator will cause serious fogging of the lens or even non-formability of the lens. The lens of the present invention can avoid fogging of the lens, and has good optical performance. It can be seen from Comparative Example 3 and Comparative Example 4 that the lens of the present invention can effectively absorb infrared light, with an infrared absorption rate being far greater than that of common infrared absorbers. It can be seen from Comparative Example 5 that the addition of a dyeing modifier in the present invention can ensure that the lens is dyed uniformly without a blotchy appearance. It can also be seen from the examples and comparative examples that different additives will have an impact on each other. While ensuring the improvement on the performance of a certain additive, it is also necessary to pay attention to whether it has an impact on other properties.

The examples of the present invention have been described above; however, the above description is exemplary, and not exhaustive, and the present invention is not limited to the disclosed Examples. Without departing from the scope and spirit of the illustrated examples, many modifications and changes are obvious to those of ordinary skill in the art.

What is claimed is:

1. An anti-blue light anti-infrared resin lens with refractive index of 1.50, comprising 100 parts by weight of diethylene glycol bis-allycarbonate, 1-3 parts by weight of an initiator, and 2.216-19.31 parts by weight of an additive, wherein the additive comprises an anti-infrared absorber, a blue light absorber, and a hardness modifier at a weight ratio of 0.001-0.3:0.01-5:2-8, and the initiator is benzoyl peroxide, dicumyl peroxide, or 1,1-di-tert-butylperoxy-3,3,5-trimethylcyclohexane; wherein the additive further comprises a dyeing modifier, the weight ratio of the dyeing modifier to the diethylene glycol bis-allycarbonate is 0.0001-0.1:100, and the dyeing modifier is a siloxane-based leveling and dispersing agent;

wherein the anti-blue light anti-infrared resin lens is prepared by the following steps:

(1) mixing of materials, comprising: pre-dissolving the blue light absorber in the diethylene glycol bis-allycarbonate heated to 40-55° C., cooling to a normal temperature over half an hour, then sequentially adding the anti-infrared absorber, the hardness modifier and the dyeing modifier, and finally adding an initiator and mixing for 1-2 hrs under vacuum;

(2) pouring of materials, comprising: filtering the uniformly mixed materials in the step (1) and then pouring into a glass mold, and sealing;

(3) primary curing, comprising: positioning the mold with poured materials in the step (2) in a curing furnace for primary curing and forming, wherein the curing time vs temperature curve comprises: an initial temperature of 25-30° C., heating up to 60-65° C. over 1 hr, then heating up to 80-85° C. over 1 hr and holding at 80-85° C. for 20 hrs, heating up to 90-95° C. over 16 hrs, heating up to 100-105° C. over 3 hrs, and then cooling to 75-80° C. over 0.5 hr;

(4) releasing from the mold, edging, and cleaning;

(5) secondary curing, comprising: positioning the cleaned lens in the curing oven again for secondary curing at a curing temperature of 105-110° C., for a time of 2-2.5 hrs; and (6) standing the lens after secondary curing in a dyeing tank and dying at 85-95° C. for half an hour;

wherein the anti-blue light anti-infrared resin lenses has an absorption rate of 50-90% in a near-infrared range of 760-1400 nm, an anti-blue light indicated by a band pass rate being less than 1% at 410 nm, a blue light absorption rate of 10-30% in a range of 380-500 nm, and a visible light transmittance with 15-16%.

2. The anti-blue light anti-infrared resin lens with refractive index of 1.50 according to claim 1, wherein the additive comprises the weight ratio of the dyeing modifier to the diethylene glycol bis-allycarbonate is 0.005-0.03:100.

3. The anti-blue light anti-infrared resin lens with refractive index of 1.50 according to claim 1, wherein the diethylene glycol bis-allycarbonate is a mixture of monomeric diethylene glycol allyl carbonate and a polymer thereof, in which content of the monomeric diethylene glycol allyl carbonate is 80-90%, and the polymer is a dimer and/or a trimer of diethylene glycol allyl carbonate which contains 10-20%.

4. The anti-blue light anti-infrared resin lens with refractive index of 1.50 according to claim 1, wherein the anti-infrared absorber is prepared by uniformly dispersing a rare earth element oxide with a diameter of 10-50 nm in ethylene-butyl acrylate, where amount of the rare earth element oxide is 0.5%-5% of the anti-infrared absorber by weight.

5. The anti-blue light anti-infrared resin lens with refractive index of 1.50 according to claim 1, wherein the additive further comprises an anti-shrinkage modifier and a self-release modifier, where the weight ratio of the anti-shrinkage modifier and the self-release modifier to the diethylene glycol bis-allycarbonate is 0.01-5:0.01-5:100.

6. The anti-blue light anti-infrared resin lens with refractive index of 1.50 according to claim 5, wherein the weight ratio of the anti-shrinkage modifier and the self-release modifier to the diethylene glycol bis-allycarbonate is 0.1-3:0.1-3:100.

* * * * *